(12) United States Patent
Okigami

(10) Patent No.: US 7,376,966 B2
(45) Date of Patent: May 20, 2008

(54) UNAUTHORIZED USAGE MONITORING SYSTEM FOR IMAGE PROCESSING DEVICES AND METHOD FOR CONTROLLING UNAUTHORIZED USAGE MONITORING SYSTEM

(75) Inventor: Masafumi Okigami, Soraku-gun (JP)

(73) Assignee: Sharp Kabushiki Kaisha (JP)

( * ) Notice: Subject to any disclaimer, the term of this patent is extended or adjusted under 35 U.S.C. 154(b) by 719 days.

(21) Appl. No.: 10/762,757

(22) Filed: Jan. 20, 2004

(65) Prior Publication Data

US 2005/0005130 A1 Jan. 6, 2005

(30) Foreign Application Priority Data

Jan. 21, 2003 (JP) ............... 2003-012462

(51) Int. Cl.
*G06K 19/00* (2006.01)
(52) U.S. Cl. ............ 726/4
(58) Field of Classification Search .......... 726/4, 726/7, 21, 28, 34; 358/1.15
See application file for complete search history.

(56) References Cited

U.S. PATENT DOCUMENTS 5,475,377 A * 12/1995 Lee ............ 340/5.9
5,673,190 A * 9/1997 Kahleck et al. ........ 700/2
6,807,388 B1 * 10/2004 Kojima et al. ......... 399/80
7,216,360 B2 * 5/2007 Nakao et al. .......... 726/7

FOREIGN PATENT DOCUMENTS

JP 11-24859 1/1999
JP 2002-116901 4/2002

* cited by examiner

*Primary Examiner*—Ellen Tran
(74) *Attorney, Agent, or Firm*—David G. Conlin; George N. Chaclas; Edwards Angell Palmer & Dodge LLP

(57) ABSTRACT

An unauthorized usage monitoring system for image processing devices of the present invention sets a higher information storage ratio for a smaller number of people present in an office when determining, based on an information storage ratio, whether or not to store to a storage portion 15 information in which a user ID code and image data are associated. The information ratio is compared with a random number, and information in which the image data and the ID code of the user who requested image processing are associated is stored to the storage portion 15 only when the information storage ratio is higher than the random number.

19 Claims, 10 Drawing Sheets

FIG. 4

Basic storage ratios

| Time period | During office hours of a business day | Outside office hours of a business day | Holiday |
|---|---|---|---|
| Monochrome | 0.04 | 0.06 | 0.10 |
| Color | 0.40 | 0.60 | 1.00 |

User data

14o

| User ID | Degree of need for color | |
|---|---|---|
| ......... | ......... | ... ... ... |
| 04567 | 0.60 | Suzuki |
| ......... | ......... | ... ... ... |
| 05678 | 0.90 | Takahashi |
| 06789 | 0.30 | Yamamoto |
| ......... | ......... | ... ... ... |
| 12345 | 0.00 | Tanaka |
| ......... | ......... | ... ... ... |

User data

| User ID | Name | Department ID | Supervisor ID | Host name | Sign in/sign out time data | ... ... ... |
|---|---|---|---|---|---|---|
| 01234 | ○田 ○男 | 01110 | 00678 | ... ... ... | ... ... ... | ... ... ... |

Department ID

| Department ID | Department name | ... ... ... | Location | Facilities equipment data | ... ... ... |
|---|---|---|---|---|---|
| 01110 | XX center, first development department | ... ... ... | ... ... ... | ... ... ... | ... ... ... |

| Other people | More than 3 people | 1 or 2 people | 0 people |
|---|---|---|---|
| Monochrome | 0.04 | 0.06 | 0.10 |
| Color | 0.40 | 0.60 | 1.00 |

86

UNAUTHORIZED USAGE MONITORING SYSTEM FOR IMAGE PROCESSING DEVICES AND METHOD FOR CONTROLLING UNAUTHORIZED USAGE MONITORING SYSTEM

CROSS-REFERENCE TO RELATED APPLICATION/PRIORITY

This Nonprovisional application claims priority under 35 U.S.C. § 119(a) on patent application Ser. No. 2003-012462 filed in Japan on Jan. 21, 2003, the entire contents of which are hereby incorporated by reference.

FIELD OF THE INVENTION

The present invention relates to unauthorized usage monitoring systems for monitoring unauthorized usage of image processing devices such as printers, scanners, copying machines, and multifunctional machines thereof.

BACKGROUND OF THE INVENTION

Many offices and the like in recent years are configured as systems in which terminals such as personal computers are connected via a network to image processing devices such as digital multifunctional machines. It is typical for these kinds of image processing devices to be configured as multifunctional machines that serve such roles as a printer, a scanner, and a copying machine. In functioning as a printer, such a multifunctional machine receives print data (image data or text data) via the network from a terminal and, based on the print data, records the images and text onto recording paper. Or, when functioning as a scanner, it displays an image of a scanned original on the display of a terminal. Moreover, when functioning as a copying machine, it records onto recording paper the image of the original that was scanned with the scanning function.

Image processing devices such as these greatly contribute to improved work efficiency in offices. However, as they can be used simply and easily, they are sometimes subjected to unauthorized usage for private (personal) purposes other than work.

Conventional technology that focuses on inhibiting such unauthorized usage of image processing devices is disclosed in Japanese Laid-Open Patent Publication No. Hei 11-24859 (hereafter "patent document 1") and Japanese Laid-Open Patent Publication No. 2002-116901 (hereafter "patent document 2").

A configuration is disclosed in patent document 1 in which a plurality of personal cards are provided on which individual information corresponding to users of a system is recorded, and a key counter with a plurality of insertion slots for the personal cards is connected to a multifunction printer. One of the insertion slots is for the copying function of the printer, and another insertion slot is for the printing function of the printer, and when a personal card is read at the insertion slot of the key counter for the printing function, the individual information that is read out is verified against the individual information at the time of logging on to the network. The result of this verification is that the print data saved by a server can be printed by a printer on the condition that the individual information is in agreement. Furthermore, the number of sheets printed by each user can be recorded in a data storage portion when a print operation is carried out.

The invention in patent document 2 has been proposed by the inventor of the present invention. When data is to be recorded onto recording paper, the ID code of the user who requested the data to be recorded is stored in association with the recorded data, thus enabling an administrator to know which users have recorded which data, and making it possible to ascertain unauthorized usage of an image processing device. Furthermore, in patent document 2, whether or not to store data in which the ID code of the user is associated with the recorded image data is determined based on preset storage ratios for each user.

However, with the techniques disclosed in the above-described patent documents, it is possible that a large volume of image data that does not need to be recorded, that is, even information that does not involve unauthorized usage, is nonetheless recorded. And for this reason, not only is a storage device with a large storage capacity required, but numerous tasks become required to carry out the job of monitoring with an administrator distinguishing whether or not unauthorized usage has been made of recorded information, thus increasing the burden on the administrator.

It should be noted that consideration is given in patent document 2 to presetting storage ratios on a per-user basis and recording information that has a high probability for unauthorized usage, but the effectiveness therein was as yet insufficient and further improvements were required.

SUMMARY OF THE INVENTION

In the present invention, consideration is given to the fact that the number of people in a space where the users are (an environmental condition of the user vicinity) affects "the tendency for unauthorized usage of an image processing device," and the information storage ratios are varied in accordance with this environmental condition to determine whether or not to carry out information storage to the storage means. In other words, the greater the tendency for unauthorized usage of the image processing device can occur in an environment, the higher the information storage ratio is set, and this enables image data with a high potential for unauthorized usage to be stored with a high ratio.

Specifically, an unauthorized usage monitoring system for monitoring unauthorized usage of an image processing device, which performs image processing in response to a request for image processing is provided. This unauthorized usage monitoring system is provided with an identification means, a storage means, and a determination means. The identification means is for identifying a user who requests image processing. The storage means is capable of storing information in which the user identified by the identification means is associated with at least a portion of the image data for which the user requested image processing. The determination means is for determining whether or not to carry out information storage to the storage means. Also, the determination means uses an information storage ratio that is set based on a tendency for unauthorized usage of the image processing device corresponding to an environmental condition (the number of people in the vicinity of the user who requested image processing, for example) to determine whether or not to carry out information storage to the storage means.

Furthermore, the following configuration can also be provided as another configuration of the unauthorized usage monitoring system of the present invention. Namely, an unauthorized usage monitoring system for monitoring unauthorized usage of an image processing device, which performs image processing in response to a request for image processing is provided. This unauthorized usage monitoring system is provided with an identification means, a storage means, and a determination means. The identification means is for identifying an ID code a user who requests image processing. The storage means is capable of storing information in which the ID code of the user identified by the identification means is associated with at least a portion of the image data for which the user requested image processing. The determination means is for determining whether or not to carry out information storage to the storage means. Also, the determination means uses an information storage ratio that is set based on a tendency for unauthorized usage of the image processing device corresponding to an environmental condition to determine whether or not to carry out information storage to the storage means.

With these specified items, the information storage ratio is set based on a tendency for unauthorized usage of the image processing device corresponding to an environmental condition at the time when a user makes a request for image processing to the image processing device. In other words, the greater the tendency for unauthorized usage of the image processing device can occur in an environment, the higher the information storage ratio is set. Then, when the determination means carries out a determination operation in which the information storage ratio is used, and it is determined to carry out information storage to the storage means, information in which the user (user ID code) identified by the identification means, and at least a portion of the image data for which the user requested image processing are associated is stored in the storage means. After this, an administrator can ascertain whether or not there has been unauthorized usage of the image processing device, and any user involved, by viewing the information stored in the storage means, and further unauthorized usage can be inhibited in such ways as warning the user involved.

In this way, such a configuration of the present invention enables image data with a high potential for unauthorized usage to be stored with a high ratio, the result of which is that it is possible to achieve savings of the storage capacity of the storage means, a lighter burden on the administrator for monitoring, and improved efficiency in the task of monitoring.

The unauthorized usage monitoring system of the present invention may also be configured so that the image processing device can send and receive information to and from a monitoring server, with the storage means being provided in the monitoring server. The following configuration is possible in this case. Namely, an unauthorized usage monitoring system for monitoring unauthorized usage of an image processing device, which is configured to be capable of sending and receiving information to and from a monitoring server, is provided. The unauthorized usage monitoring system is provided with an identification means, a storage means, and a determination means. The identification means is for identifying a user who requests image processing. The storage means is provided in the monitoring server and is capable of storing information in which the user identified by the identification means is associated with at least a portion of the image data for which the user requested image processing. The determination means is for determining whether or not to carry out information storage to the storage means. Also, the determination means determines whether or not to carry out information storage to the storage means with an information storage ratio that is set based on a tendency for unauthorized usage of the image processing device corresponding to an environmental condition.

This configuration is effective, for example, in situations in which a network is configured with multiple image processing devices and a monitoring server. That is, it is possible for the administrator to centrally manage any unauthorized usage made of the respective image processing devices based on information stored in the monitoring server.

The following is a specific example of a determination operation by the determination means. First, the determination means determines whether or not to carry out information storage to the storage means by comparing a set information storage ratio with a random number.

Furthermore, one of the environmental conditions for setting the information storage ratio may be the number of people in a space in which the image processing device is installed. In this case, in determining whether or not to carry out information storage to the storage means, the determination means uses an information storage ratio that is higher for lower numbers of people (fewer people) in the space in which the image processing device is installed. That is, the smaller the number of people in a space in which the image processing device is installed, the greater the tendency for unauthorized usage of the image processing device can occur, and therefore by giving consideration to this, image data with a high potential for unauthorized usage can be stored with a high ratio.

Furthermore, one of the environmental conditions for setting the information storage ratio may be the date and time. In this case, in determining whether or not to carry out information storage to the storage means, the determination means uses an information storage ratio that is higher for days and times in which "the tendency for unauthorized usage of the image processing device" is higher. In this case too, by giving consideration to the fact that the smaller the number of people in a space in which the image processing device is installed, the greater the tendency for unauthorized usage of the image processing device can occur, and by estimating the number of people depending on the date and time, it is possible based on this to store image data with a high potential for unauthorized usage with a high ratio.

It should be noted that in this configuration of the present invention, the number of people present is estimated by recognizing the date and time, and determining with this the tendency for unauthorized usage of the image processing device can occur. However, even in offices or the like, for example, the tendency for unauthorized usage of the image processing device can occur may vary depending on the time period or the like regardless of the number of people present. Examples of such time periods include holidays, during breaks, and times outside office hours. Accordingly, by recognizing the date and time, it is possible to directly determine the tendency for unauthorized usage of the image processing device can occur, and with an information storage ratio that is set based on this, it is thus possible to determine whether or not to carry out information storage to the storage means.

Further still, with an unauthorized usage monitoring system for an image processing device that is installed in an office, it is also possible that, in determining whether or not to carry out information storage to the storage means, the determination means obtains information concerning signing in to and signing out from work at the office, and uses an information storage ratio that is higher for lower numbers of people signed in at the office. For example, even in cases in which the number of people present in the vicinity of the same time period varies remarkably due to office holidays, uneven attendance levels for work on holidays, flextime systems and the like, the number of people present can be accurately estimated, thus enabling improved monitoring efficiency to be achieved. It should be noted that the information concerning signing in to and signing out from work referred to here may be the number of employees in the space in which the image processing device is installed, and it may be the number of employees within a group of users (users within the same department for example) who are authorized to use that image processing device.

Furthermore, with an unauthorized usage monitoring system for an image processing device that is installed in an office, it is also possible that, in determining whether or not to carry out information storage to the storage means, the determination means obtains information concerning entering and exiting a room at the office, and uses an information storage ratio that is higher for lower numbers of people present in the office. For example, even in cases in which equipment is installed in numerous departments and common-use locations such as meeting rooms, reception rooms, laboratories, and the like, the number of people present in the rooms can be accurately estimated, thus enabling improved monitoring efficiency to be achieved.

Also, with an unauthorized usage monitoring system for image processing devices connected to an office network, it is possible that, in determining whether or not to carry out information storage to the storage means, the determination means obtains information concerning the number of currently operating host machines that are connected to the network, and uses an information storage ratio that is higher for lower numbers of currently operating host machines. In this way, as long as the devices are connected to the network, the number of people in a vicinity can be estimated without any special added system, thus enabling improved monitoring efficiency to be achieved.

Furthermore, in this case, the determination means may obtain information concerning the history of image processing requests to the image processing device by host machines connected to the network (requests for image processing from users using the host machines), recognize from the history information the frequency of requests for image processing of currently operating host machines other than the host machine that is requesting image processing, and use an information storage ratio that is higher for lower frequencies of requests for image processing in determining whether or not to carry out information storage to the storage means.

In other words, when the frequency of image processing requests from host machines other than the host machine that is requesting image processing is high, there is a high probability that the users of those host machines (host machines not currently requesting image processing) will subsequently request image processing and move to the location where the image processing device is installed. That is, the act of these users moving to the location where the image processing device is installed acts as a deterrent against unauthorized usage by other users. Therefore, since the probability of unauthorized usage occurring in this case is low, the storage ratio is set low. Conversely, when the frequency of image processing requests from host machines other than the host machine that is requesting image processing is low, there is a low probability that the users of those host machines (host machines not currently requesting image processing) will subsequently request image processing and move to the location where the image processing device is installed. That is, the situation is such that it is difficult for the act of these users moving to the location where the image processing device is installed to be used as a deterrent against unauthorized usage by other users. Therefore, since the probability of unauthorized usage occurring in this case is high, the storage ratio is set high. Thus, by varying the information storage ratio in response to the frequency (history) of image processing requests in the past (within a predetermined recent period) by users of host machines who are not requesting image processing, it is possible to factor in the degree of deterrent against unauthorized usage to the user to derive higher ratios for image data that has a high potential for unauthorized usage, thus enabling further improvements in monitoring efficiency to be achieved.

Furthermore, color imaging or monochrome imaging can be selected in the image processing device, and, in determining whether or not to carry out information storage to the storage means, the determination means may use an information storage ratio that is higher for the times of performing color imaging than for the times of performing monochrome imaging. That is, since the costs for recording onto recording paper are higher for color imaging in comparison to monochrome imaging, by making the storage ratio for color higher than the storage ratio for monochrome even for the same environmental conditions, the ratio of color data stored in the storage means increases, thus unauthorized usage of the image processing device can be strictly monitored.

It should be noted that a control method that is executed on the unauthorized usage monitoring system according to the above-described configurations of the present invention is also within the scope of the technical idea of the present invention. With this method, first a determination operation is performed in which whether or not to carry out information storage to the storage means is determined using an information storage ratio that is set based on a tendency for unauthorized usage of the image processing device corresponding to an environmental condition. Then a storage operation is performed in which information in which a user who requested image processing and at least a portion of the image data for which image processing was requested by that user are associated and stored in the storage means when a determination has been made to carry out information storage to the storage means.

BRIEF DESCRIPTION OF THE DRAWINGS

FIG. 4 is a data table of basic storage ratios in the first embodiment.

FIG. 5 is table of user data.

FIG. 8A shows an example of user data, and FIG. 8B shows an example of department data.

DESCRIPTION OF THE PREFERRED EMBODIMENTS

Hereinafter, embodiments of the invention are described with reference to the appended drawings.

First Embodiment

Firstly, a first embodiment is described. The embodiment is described for the case of the present invention being applied to a network system such that a plurality of user terminals (information processing devices) and one image processing device (digital copying machine) are connected to a network (a so-called LAN (Local Area Network)).

Description of Network System Configuration

Figure 1:
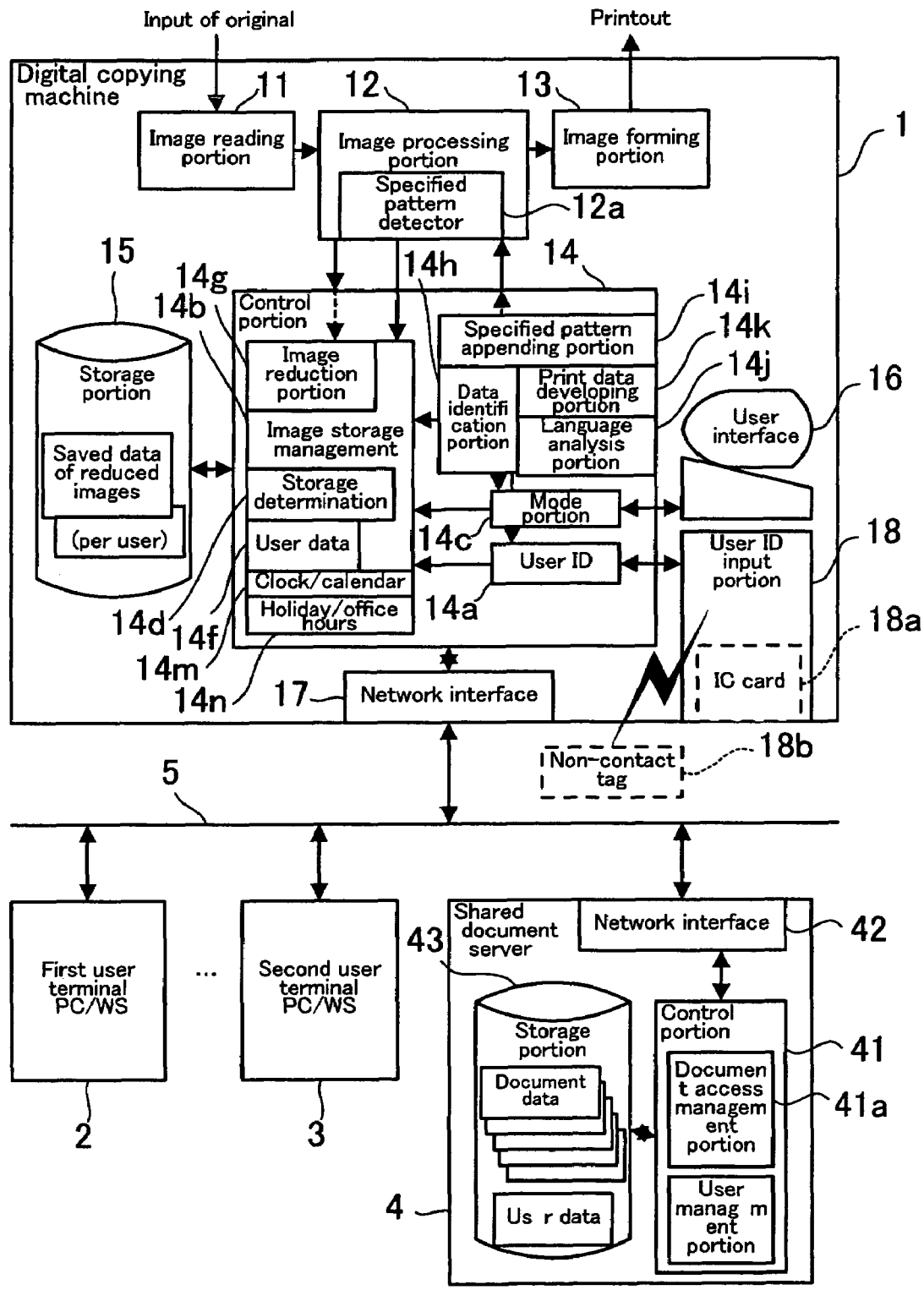
FIG. 1 is a block diagram showing the configuration of a network system according to a first embodiment.

FIG. 1 is a block diagram showing a network system provided with an unauthorized usage monitoring system according to the present invention. The network system shown in FIG. 1 is used in an office or the like and is constituted by an image processing device (digital copying machine) 1 serving as a copying machine (hereinafter also referred to as a "copier"), a printer, and a scanner; personal computers, workstations or the like as first and second user terminals 2 and 3; and a shared document server 4 or the like, all interconnected via network cabling 5.

The image processing device 1 is configured to full the function of a copier, which records a scanned original on paper, the function of a printer, which records image data received from the first and second user terminals 2 and 3 on paper, and the function of a scanner, which sends image data of a scanned original to the first and second user terminals 2 and 3.

When the image processing device 1 is used as a copier, an original is placed in an image reading portion 11, and a request to copy the original is made by an input operation at a user interface 16. In response to this, a control portion 14 activates the image reading portion 11 to copy the original. The image reading portion 11 scans the original, then generates image data based on this and outputs to an image processing portion 12. Based on the image data, an image forming portion 13 records an image onto recording paper, and discharges the recording paper.

The image processing device 1 is capable of copying monochrome images and color images. When copying an original onto recording paper, along with requesting copying, a user also selects either monochrome imaging or color imaging by operating the user interface 16. When color imaging is specified, image data representing a color image is output from the image reading portion 11, then the image data is processed by the image processing portion 12, and a color image is recorded onto the recording paper by the image forming portion 13. On the other hand, when monochrome imaging is specified, image data representing a monochrome image is output from the image reading portion 11, then the image data is processed by the image processing portion 12, and a monochrome image is recorded onto the recording paper by the image forming portion 13.

Furthermore, when the image processing device 1 is used as a printer, image data representing images, text, and the like, is sent from the first user terminal 2, for example, to the image processing device 1 via the network cabling 5. The image processing device 1 receives print data through a network interface 17, then language analysis is performed on the print data by a language analysis portion 14j that is provided in the control portion 14 and, based on the results of the language analysis, the print data is developed by a print data developing portion 14k. After various kinds of image processing are performed on the print data, the image forming portion 13 records the image onto recording paper.

Alternatively, when a request to record one set of image data is given from the second user terminal 3 to the shared document server 4 via the network cabling 5, a control portion 41 of the shared document server 4 receives this request via a network interface 42 and activates a document access management portion 41a. The document access management portion 41a searches a storage portion 43 for the image data and sends the image data to the image processing device 1 via the network cabling 5. The image processing device 1 receives this image data via the network interface 17 and supplies it to the image processing portion 12 via the control portion 14. The image data is processed by the image processing portion 12, and then supplied to the image forming portion 13. The image forming portion 13 records the image represented by this image data onto recording paper.

Thus, monochrome images and color images can also be recorded when the image processing device serves as a printer, and therefore either monochrome imaging or color imaging is requested from a terminal (the first and second user terminals 2 and 3, or the shared document server 4) to the image processing device 1.

Furthermore, when the image processing device 1 is used as a scanner, an original is placed in the image reading portion 11, and a request to scan the original is made by an input operation at the user interface 16. The image reading portion 11 scans the original and the control portion 14 performs image processing on the image data, which is based on the scan, so that it is in a format that the first user terminal 2, for example, can recognize, and then sends the data via the network cabling 5 to the first user terminal 2. The first user terminal 2 uses a preview program to display the image data on a display device of the user interface.

As described above, the image processing device 1 can serve as a copier, a printer, and a scanner. Consequently, although it improves work efficiency in the office, it is also possible to make unauthorized use of it for private purposes other than work.

Figure 2:
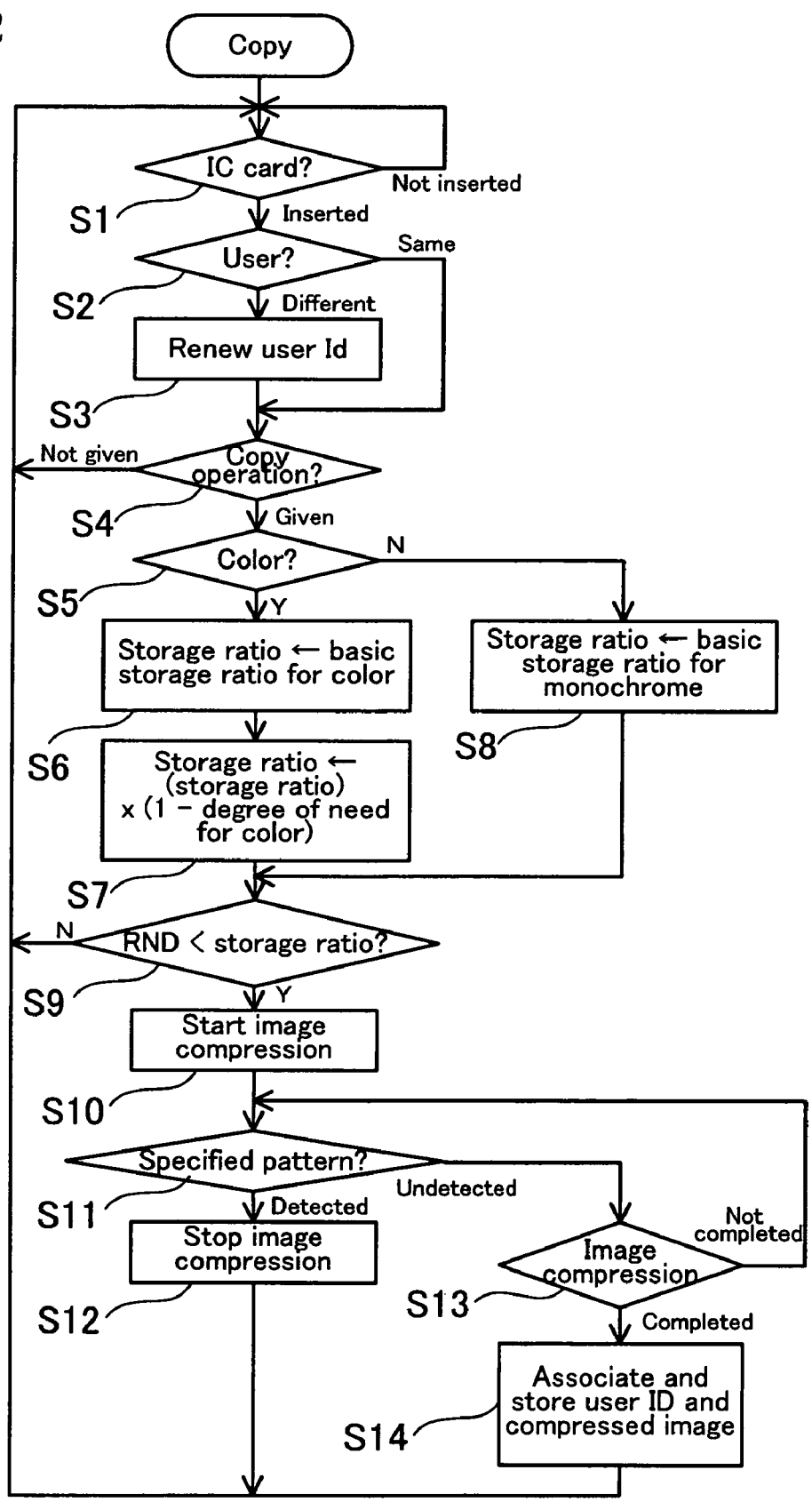
FIG. 2 is a flowchart showing the operation of a copying process according to the first embodiment.

For this reason, the unauthorized usage monitoring system of the present embodiment executes the processing operation of the flowchart shown in FIG. 2 in parallel when the device serves as a copying machine, so that at least a portion of the image data will be stored in association with an ID code of the user of the image processing device 1. Similarly, when the device serves as a printer, the unauthorized usage monitoring system of the present embodiment executes the processing operation of the flowchart shown in FIG. 3 in parallel, so that at least a portion of the image data will be stored in association with an ID code of the user. When at least a portion of the image data has been stored in association with a user ID code in this way, it is possible to know at any time which user used the device for what kind of data, and therefore by ascertaining a user who has made unauthorized usage of the image processing device 1 and warning that user, unauthorized usage can be inhibited.

Operation Descriptions

Copying Operation

The following is a description of the processing operation when the image processing device 1 serves as a copier, using the flowchart shown in FIG. 2.

To carry out a copying operation, the user first inserts an IC card 18a, which has been given in advance, into a user ID input portion 18 of the image processing device 1. Alternatively, a non-contact tag 18b, which is able to transmit the user ID in a non-contact manner, is brought into the vicinity of the user ID input portion 18.

The user ID input portion 18 is standing by for the insertion of an IC card ("not inserted" status at step S1), and once an IC card is inserted ("inserted" status at step S1), the ID code of the user is read from the IC card, and this ID code is then output to the control portion 14. A user ID identification portion (an identification means) 14a of the control portion 14 receives the ID code and verifies it against the previously stored ID code (step S2). If the ID code does not match the previous ID code (determined to be "different" at step S2), the ID code is stored and the previous ID code is deleted so as to renew the ID code (step S3). If the ID code matches the previous ID (determined to be "same" at step S2), step S3 is skipped. Then, the user ID identification portion 14a notifies an image storage management portion 14b of the ID code of the IC card.

Thereafter, the original image is placed in the image reading portion 11 and the user interface 16 is operated to command a copy of the original with monochrome imaging specified, for example. When a copying command is given (determined to be "given" at step S4) and monochrome image copying is specified (determined to be "no" at step S5), a mode portion 14c of the control portion 14 notifies the image storage management portion 14b, the image reading portion 11, the image processing portion 12, and the image forming portion 13 that the copying operation is to be performed with monochrome imaging.

In response to this, the image reading portion 11 scans the original image and outputs image data representing a monochrome image. This image data is processed by the image processing portion 12 and then supplied to the image forming portion 13, where the monochrome image is recorded onto recording paper.

The image processing portion 12 outputs the image data also to the image storage management portion 14b of the control portion 14. Furthermore, a specified pattern detector 12a of the image processing portion 12 attempts to detect a specified pattern (an authentication pattern) that has been preset for the image data. If a specified pattern is detected from the image data, the specified pattern is output to the image storage management portion 14b of the control portion 14.

On the other hand, in response to the notification for monochrome image copying from the mode portion 14c, a storage determination portion (a determination means) 14d of the image storage management portion 14b determines a storage ratio for monochrome imaging (step S8). To determine this storage ratio, the storage determination portion 14d references a basic storage ratio data table 14e, which is shown in FIG. 4. The basic storage ratios for monochrome imaging and color imaging are registered respectively in the basic storage ratio data table 14e in regard to "During office hours of a business day," "Outside office hours of a business day," and "Holiday" for the office. Specifically, the basic storage ratio is set higher for "Outside office hours of a business day" than for "During office hours of a business day," and the basic storage ratio is set higher for "Holiday" than for "Outside office hours of a business day."

This is because consideration is given to conditions such as the number of people in an office space where the users are (environmental conditions of the user vicinity) and the date and time (time-related environmental conditions) that affect the tendency for unauthorized usage of an image processing device, and the information storage ratios (basic storage ratios) are varied in accordance with such environmental conditions. In other words, the greater the tendency for unauthorized usage of the image processing device 1 can occur in an environment (the smaller the number of people present), the higher the information storage ratio is set. This enables image data with a high potential for unauthorized usage to be stored with a high ratio.

The control portion 14 is provided with a clock/calendar portion 14m, which recognizes the current date/time, and a holiday/office hour storage portion 14n, which stores information about office holidays and office hours, and the above-described "During office hours of a business day," "Outside office hours of a business day," and "Holiday" items are differentiated by comparing the information stored in the holiday/office hour storage portion 14n with the current date/time.

Furthermore, the basic storage ratios are set higher (10 times) for "coloring imaging" than for "monochrome imaging."

This is because the cost is generally higher when recording color images as compared to recording monochrome images, and in order to allow stricter monitoring of color imaging by saving color images with a generally higher likelihood than monochrome images.

In accordance with the date/time and monochrome/color classification of when a copying operation is carried out, the storage determination portion 14d reads out a basic storage ratio from the basic storage ratio data table 14e and generates a random number RND at random that varies in the range of 0 to 1.00 with 0.01 increments, and this random number RND is compared with the basic storage ratio for monochrome imaging (for example 0.06 for monochrome image copying for "Outside office hours of a business day") (step S9). Then, if the random RND<the basic storage ratio (determined to be "yes" at step S9), the procedure proceeds to the processes that start from step S10 so that information in which the image data and the ID code of the user who requested the copy are associated and stored in the storage portion (storage means) 15 to be saved. Furthermore, if the random number>the basic storage ratio (determined to be "no" at step S9), the procedure returns to step S1 without saving the image data.

When the random number RDN<the basic storage ratio (determined to be "yes" at step S9), and the procedure has proceeded to the processes that start from step S10, an image reducing portion 14g of the image storage management portion 14b performs a reduction process (a compression process) on the image data from the image processing portion 12 (step S10). Any existing method for reducing images may be applied for this reduction process, even the simplest of such methods such as eliminating pixels from the image as appropriate.

When a specified pattern is detected in the image data by the specified pattern detector 12a of the image processing portion 12 ("detected" at step S11) in the course of reducing the image, and this is notified to the image reducing portion 14g, the image reducing portion 14g suspends the reduction process being performed on that image data (step S12). This is because the specified pattern is appended to image data shared by multiple users, and is not appended to private-use image data, so that copying an image to which this specified pattern is appended will not result in unauthorized usage of the image processing device 1, and it is not necessary to reduce and save such image data.

Prior to the completion of image reduction (prior to "completed" at step S13), if no specified pattern is detected in the image data ("undetected" is maintained at step S11), the image storage management portion 14*b* associates the reduced image data with the ID code of the IC card and stores them in the storage portion 15 (step S14).

On the other hand, when a copying command is given at the user interface 16 (determined to be "given" at step S4) and color image copying is specified (determined to be "yes" at step S5), notification is sent from the mode portion 14*c* to the image storage management portion 14*b*, the image reading portion 11, the image processing portion 12, and the image forming portion 13 that the copying operation is to be performed with color imaging.

In response to this, the image reading portion 11 scans the original and outputs image data representing a color image. This image data is processed by the image processing portion 12 and the color image is recorded onto recording paper by the image forming portion 13.

The image processing portion 12 outputs the image data to the image storage management portion 14*b* of the control portion 14, and the specified pattern detector 12*a* of the image processing portion 12 attempts to detect a specified pattern in the image data.

On the other hand, in response to the notification for color image copying from the mode portion 14*c*, the storage determination portion 14*d* of the image storage management portion 14*b*, determines a storage ratio for color imaging (steps S6 and S7). To determine this storage ratio, the storage determination portion 14*d* references the basic storage ratio data table 14*e*, which is shown in FIG. 4, and a user data table 14*o*, which is shown in FIG. 5. Stored in this user data table 14*o* are the names of a plurality of users and their degree of need for color imaging associated with their user ID code. For example, for the case of "Outside office hours of a business day," the storage determination portion 14*d* reads out the basic storage ratio for color imaging, 0.60, from the basic storage ratio data table 14*e*, and also reads out the degree of need for color that corresponds to the ID code of that IC card from the user data table 14*o*, and then calculates (1—degree of need for color)×basic storage ratio of 0.60 to determine the applicable storage ratio. For example, if the degree of need for color is 0.60, then the applicable storage ratio is determined as (1−0.60)×0.60=0.24.

Further still, the storage determination portion 14*d* generates a random number RDN at random that varies in the range of 0 to 1.00 with 0.01 increments, and this random number RND is compared with the applicable storage ratio, 0.24 (step S9). Then, if the random RND<the applicable storage ratio of 0.24 (if determined to be "yes" at step S9), the procedure proceeds to the processes that start from step S10 so that image data that represents the color image can be stored and saved. Furthermore, if the random number≧the applicable storage ratio of 0.24 (if determined to be "no" at step S9), the procedure returns to step S1 without saving the image data.

When image data representing the color image is stored and saved, the image data from the image processing portion 12 undergoes a reduction process in the same manner as for monochrome images (step S10). When a specified pattern is detected in the image data by the specified pattern detector 12*a* of the image processing portion 12 ("detected" at step S11) in the course of reducing the image, the reduction process being performed on that image data is suspended (step S12) since this image data is shared by multiple users. Furthermore, prior to the completion of image reduction (prior to "completed" at step S13), if no specified pattern is detected in the image data ("undetected" is maintained at step S11), the image storage management portion 14*b* associates the reduced image data with the ID code of the IC card and stores them in the storage portion 15.

Print operation

Figure 3:
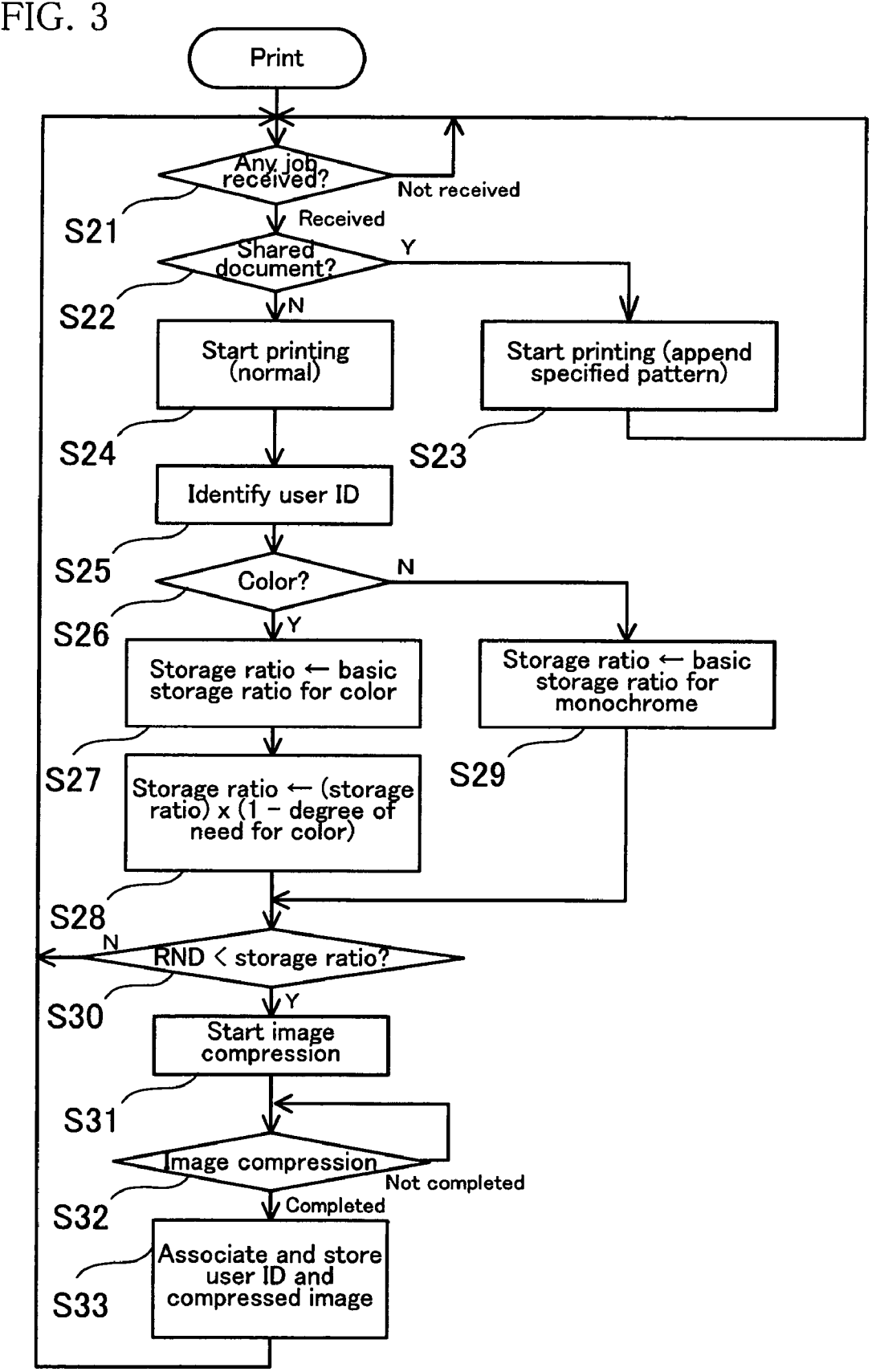
FIG. 3 is a flowchart showing the operation of a printing process according to the first embodiment.

The following is a description of the processing operation when the image processing device 1 serves as a printer, using the flowchart shown in FIG. 3.

As noted above, the image processing device 1 receives image data from the first or second user terminals 2 and 3 or the shared document server 4 and records the image represented by the image data. In the image processing device 1, a data identification portion 14*h* of the control portion 14 stands by to receive image data from the network cabling 5 via the network interface 17 ("not received" status at step S21), and once the data identification portion receives image data ("received" status at step S21), it extracts the header that is appended to the image data and reads from the header the address of the user terminal 2, which sent the image data. The data identification portion 14*h* then determines whether or not the address belongs to the shared document server 4 (step S22). If the address belongs to the shared document server 4 (determined to be "yes" at step S22), the data identification portion 14*h* reads the header and notifies the image processing portion 12 of whether monochrome imaging or color imaging is specified (step S23). A specified pattern appending portion 14*i* of the controller 14 appends pattern data that represents a specified pattern to the image data and sends this image data to the image processing portion 12, then the procedure returns to step S21.

The image data is processed by the image processing portion 12 and then supplied to the image forming portion 13, where either a monochrome or color image is reproduced on recording paper. A specified pattern is appended to the recorded image.

In other words, an image with a specified pattern appended is recorded without saving the image data in the case of image data received from the shared document server 4. This is because image data from the shared document server 4 is data that is shared by multiple users and carrying out recording of such images does not involve unauthorized usage of the image processing device 1, and it is therefore unnecessary to save such image data.

It should be noted that when the recording paper printed here (recording paper on which is printed an image that has a specified pattern attached) is copied, the specified pattern will be detected as described above at step 11 in FIG. 2, and therefore the image data representing this image will not be saved.

When the address read from the header does not belong to the shared document server 4 (determined to be "no" at step S22), the data identification portion 14*h* reads the header to determine whether monochrome imaging or color imaging has been specified, and notifies the image processing portion 12 and the print image storage management portion 14*b* of whether it is monochrome imaging or color imaging, then supplies the image data to the image processing portion 12 and the print image storage management portion 14*b* (step S24). The image processing portion 12 processes the image data and supplies it to the image forming portion 13. The image forming portion 13 records onto recording paper either a monochrome image or a color image that represents the image data.

If the address that is read from the header does not belong to the shared document server 4, the image data will have been sent from either the first or second user terminals 2 and 3. In this case, the header contains the address of the user terminal, as well as the ID code of the user at the user terminal. The data identification portion 14*h* reads the ID code from the header and notifies this to the image storage management portion 14*b* (step S25).

Then, if monochrome imaging is specified (determined to be "no" at step S26), the storage determination portion 14*d* of the image storage management portion 14*b* carries out the same process as that described above for step S8 in FIG. 2 to determine a basic storage ratio for monochrome imaging (step S29). Furthermore, when the random number RDN<the basic storage ratio (determined to be "yes" at step S30), the procedure proceeds to the processes that start from step S31 so that the image data that represents the monochrome image can be stored and saved. Furthermore, if the random number≧the basic storage ratio (determined to be "no" at step S30), the procedure returns to step S21 without saving the image data.

At step S31, the image reducing portion 14*g* of the image storage management portion 14*b* performs a reduction process on the image data. Then, once reduction of the image is completed (determined to be "completed" at step S32), the image storage management portion 14*b* associates the image data that has been reduced with the ID code of the IC card, and stores these in the storage portion 15 (step S33).

On the other hand, if a request for color imaging is read from the header of the image data that is received (determined to be "yes" at step S26), the storage determination portion 14*d* of the image storage management portion 14*b* carries out the same processes as described above steps S6 and S7 in FIG. 2 to determine an applicable storage ratio for color imaging (steps S27 and S28). Then, if the random number RDN<the applicable storage ratio (determined to be "yes" at step S30), the procedure proceeds to the processes that start from step S31 so that the image data that represents the color image can be stored and saved. Furthermore, if the random number≧the applicable storage ratio (determined to be "no" at step S30), the procedure returns to step S21 without saving the image data.

Image data reduction is also performed in the case of saving image data that represents a color image (steps S31 and S32), with the reduced image data being associated with the ID code of the IC card, and these are stored in the storage portion 15 (step S33).

In using the image processing device 1 in this way, at least a portion of the recorded data is stored in the storage portion 15 in association with the ID code of the user. And thus, by reading out the contents stored in the storage portion 15, it is possible to know which user recorded what kind of data, therefore enabling unauthorized usage of the image processing device 1 to be ascertained and such unauthorized usage to be inhibited.

Copying and printing operations are carried out as described above. And to achieve these, an unauthorized usage monitoring system according to the present invention is configured with the above-described user ID identification portion 14*a*, the storage portion 15, and the storage determination portion 14*d*.

As described above, the present embodiment gives consideration to conditions such as the number of people in an office space where the users are (environmental conditions of the user vicinity) and the date and time (time-related environmental conditions) that affect the tendency for unauthorized usage of an image processing device, and the storage ratios are varied in accordance with such environmental conditions, with the storage determination portion 14*d* determining whether or not to store information in the storage portion 15. In other words, the greater the tendency for unauthorized usage of the image processing device 1 can occur in an environment, the higher the storage ratio is set. This enables image data with a high potential for unauthorized usage to be stored with a high ratio. And in this way it is possible to avoid a situation in which large volumes of information not involved with unauthorized usage ends up being stored in the storage portion 15, and thus it is possible to achieve reduction in the volume of data stored in the storage portion 15, a lighter burden on the administrator for monitoring, and improved efficiency in the task of monitoring.

Furthermore, when carrying out color imaging, the storage determination portion 14*d* determines whether or not to store information to the storage portion 15 using a higher information storage ratio than for when monochrome imaging is carried out. This is in consideration of the fact that color data, in comparison to monochrome data, involves increased costs for recording onto recording paper, and by making the storage ratio for color higher than the storage ratio for monochrome even for the same environmental conditions, the likelihood of color data being stored in the storage portion 15 increases, and in this way it is possible to achieve reductions in the losses caused by unauthorized usage by strictly monitoring the unauthorized usage of image processing devices.

Furthermore, in the present embodiment, the information storage ratios also vary according to users who have a need for color imaging as part of their work, and users who do not have such a need. For example, a user employed for accounting duties or the like in an office has few occasions for recording color images, but a user employed in planning or design has many occasions for recording color images. Therefore, as described above, a basic storage ratio for color imaging in the basic storage ratio data table 14*e* of FIG. 4 and a degree of need for color imaging of a user in the user data table 14*o* shown in FIG. 5 are read out to calculate (1—degree of need for color)×the basic storage ratio, thus determining an applicable storage ratio that reflects the number of people in the user's vicinity and corresponds to that user, and any color images are saved in accordance with the applicable storage ratio.

This processing operation also reduces the volume of stored data, and enables the storage capacity of the storage portion 15 to be saved, thus making easier the administrative task of reading out the contents of the storage portion 15 and ascertaining unauthorized usage of the image processing device 1.

Furthermore, since image data is stored in the present embodiment after a reduction process has been carried out on the image data, the volume of data that is stored is reduced, thus making easier the administrative task of ascertaining unauthorized usage.

Second Embodiment

Next, a second embodiment is described. The embodiment is described for the case, as shown in FIG. 6, of the present invention being applied to a network system such that a plurality of user terminals 2 and 3, a plurality of image processing devices 1 and 7, a shared document server 4, and a monitoring server 6 are connected to a network (LAN).

Figure 6:
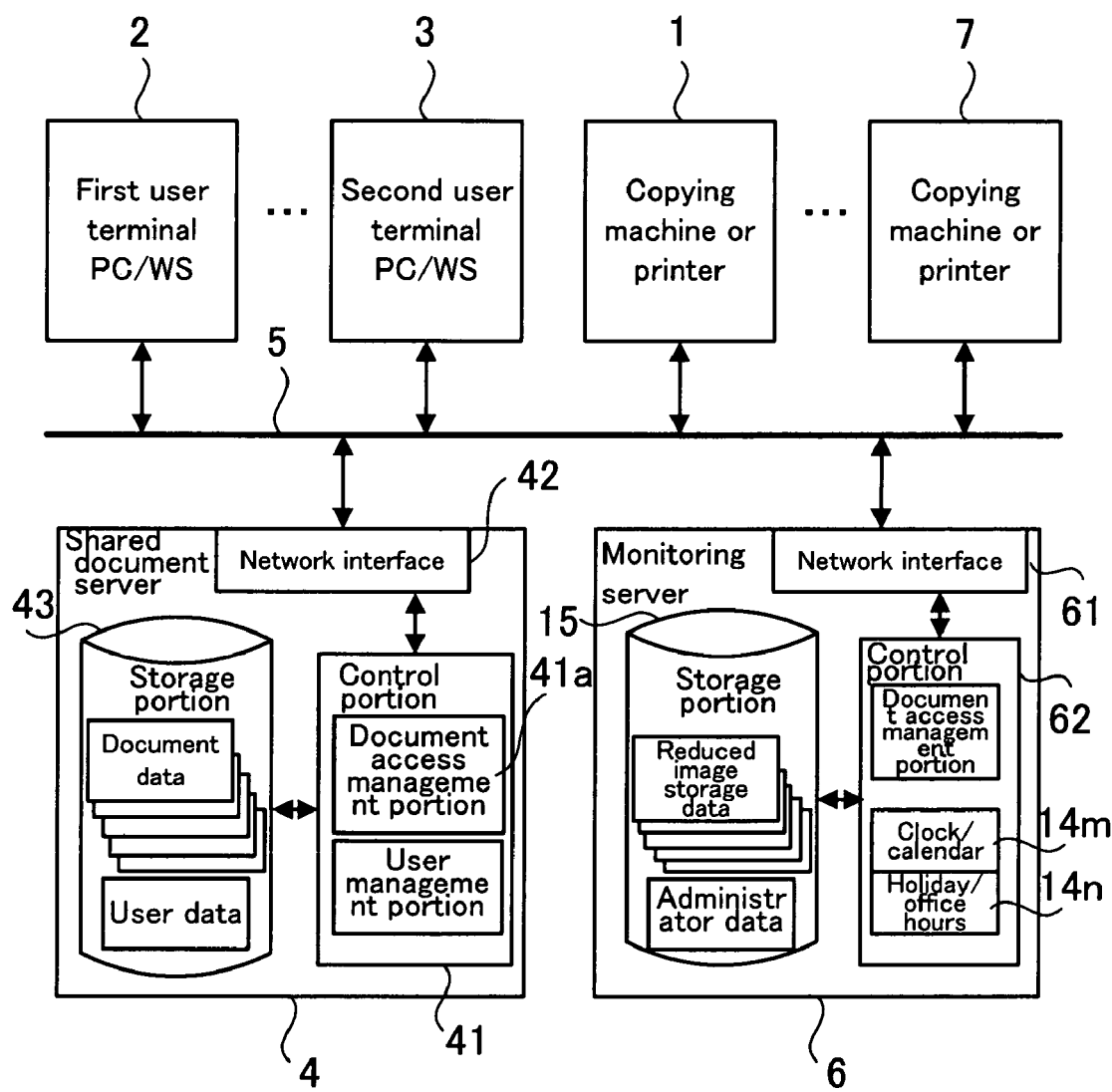
FIG. 6 is a block diagram showing the configuration of a network system according to a second embodiment.

The same reference numerals are used in FIG. 6 for components that are the same as in the above-described first embodiment. And only the points that differ from the first embodiment are described below.

As shown in FIG. 6, the network system according to the present embodiment is arranged with the separate monitoring server 6, and the storage portion 15 is provided in this monitoring server 6. That is, information in which the user (ID code) and image data are associated is stored in the monitoring server 6, not the image processing device 1.

When it is determined that information is to be stored to the storage portion 15 (when determined to be "yes" at step S9 and "completed" at step S13 in the flowchart of FIG. 2, and when determined to be "yes" at step S30 and "completed" at step S32 in the flowchart of FIG. 3), the monitoring server 6 receives at a network interface 61 the information in which image data and the user ID code are associated from the image processing device 1 via the network cabling 5, and supplies this to a control portion 62. The control portion 62 stores in the storage portion 15 the information in which image data and the user ID code are associated, thus enabling monitoring by an administrator.

In the present embodiment, the storage determination portion 14d that makes the determination (the determination of whether or not to store in the storage portion 15 the information in which image data and the user ID code are associated) may be provided in each of the image processing devices 1 and 7, or may be provided in the monitoring server 6.

In the network system shown in FIG. 6, not only the image processing device 1, but also another image processing device 7 or the like is connected to the network cabling 5, and these image processing devices 1 and 7 serve in roles such as copying machines and printers. The task of supervising unauthorized usage becomes complex when information in which image data and the user ID code are associated is stored for each of these image processing devices 1 and 7. However, in the present embodiment, only the settings for the information in which image data and the user ID code are associated are provided in each of the image processing devices 1 and 7, and all the image data and user ID codes that need to be saved are centrally stored in the storage portion 15 of the monitoring server 6, and therefore the task of supervising can be performed without inviting complexity.

Third Embodiment

Figures 7, 8:
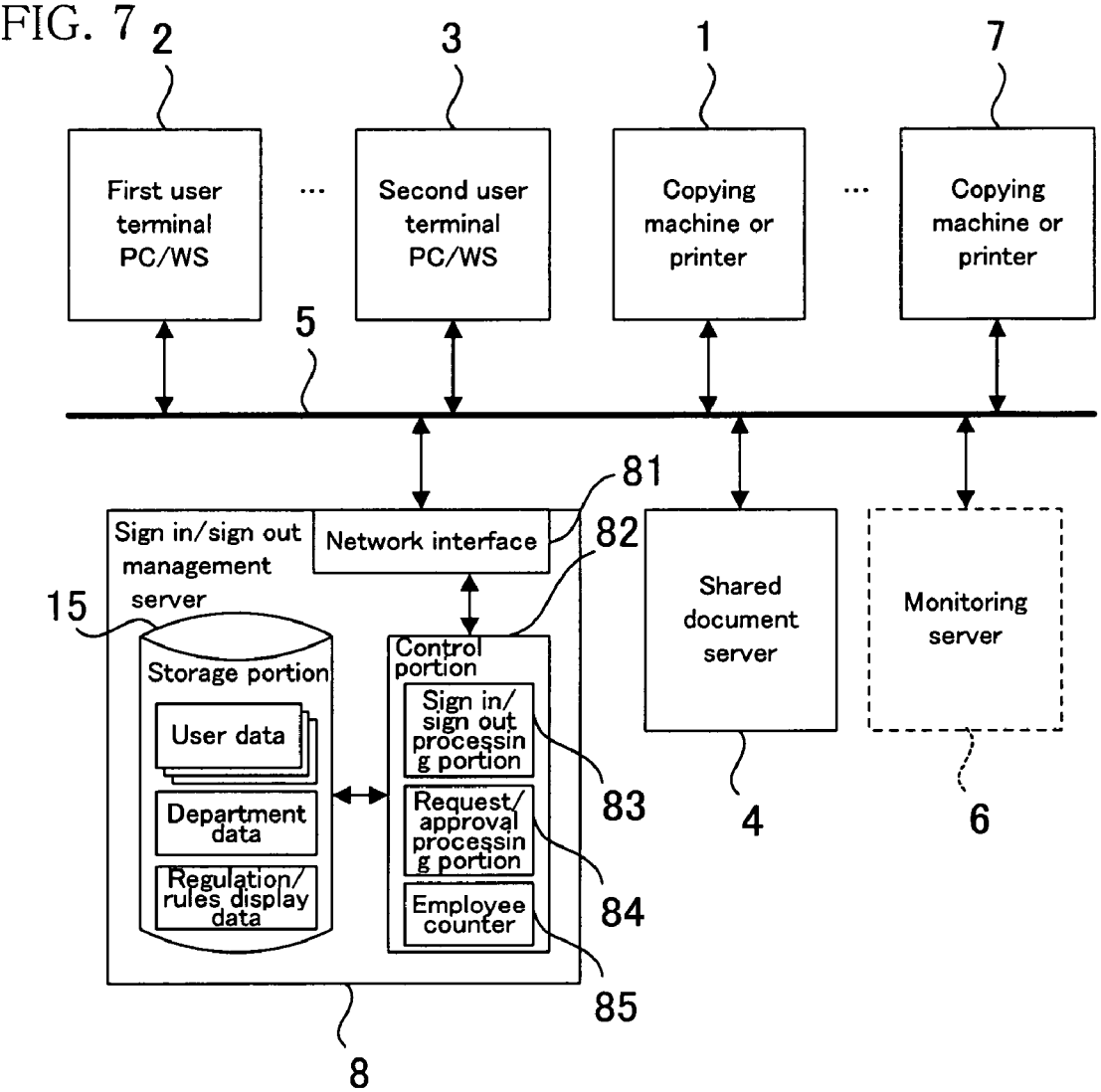
FIG. 7 is a block diagram showing the configuration of a network system according to a third embodiment.

Next, a third embodiment is described. The embodiment is described for the case, as shown in FIG. 7, of the present invention being applied to a network system such that a plurality of user terminals 2 and 3, a plurality of image processing devices 1 and 7, a shared document server 4, a monitoring server 6, and a sign in/sign out management server 8 are connected to a network (LAN). Here also, the same reference numerals are used in FIG. 7 for components that are the same as in the first embodiment and the second embodiment. And only the points that differ from the first embodiment and the second embodiment are described below.

As shown in FIG. 7, the network system according to the present embodiment is arranged with the separate sign in/sign out management server 8, and the storage portion 15 is provided in this sign in/sign out management server 8. That is, information in which the user (ID code) and image data are associated is stored in the sign in/sign out management server 8, the image processing devices 1 and 7 or the monitoring server 6.

When it is determined that information is to be stored to the storage portion 15 (when determined to be "yes" at step S9 and "completed" at step S13 in the flowchart of FIG. 2, and when determined to be "yes" at step S30 and "completed" at step S32 in the flowchart of FIG. 3), the sign in/sign out management server 8 receives at a network interface 81 the information in which image data and the user ID code are associated from the image processing device 1 via the network cabling 5, and supplies this to a control portion 82. The control portion 82 stores in the storage portion 15 the information in which image data and the user ID code are associated.

In the present embodiment, the storage determination portion 14d that makes the determination (the determination of whether or not to store in the storage portion 15 the information in which image data and the user ID code are associated) may be provided in the image processing devices 1 and 7, and may be provided in the sign in/sign out management server 8.

Furthermore, the sign in/sign out management server 8 is provided with a sign in/sign out processing portion 83, a request/approval processing portion 84, and an employee counter 85.

The sign in/sign out processing portion 83 recognizes the signing in and signing out of the users in the office. For example, it receives sign in/sign out data that is output from the user terminals 2 and 3, and stores this in the storage portion 15 as user data. Department data concerning the department to which each user is assigned is also stored in the storage portion 15.

FIG. 8A shows an example of the user data in which the "user ID,""name,""department ID,""supervisor ID,""host name,""sign in/sign out time data," and so on are stored for each user. The signing in and signing out of each user can be distinguished using the "sign in/sign out time data" of the user data. FIG. 8B shows an example of the department data in which the "department ID,""department name,""location, ""facilities equipment data," and so on are stored for each department.

Figures 9, 10:
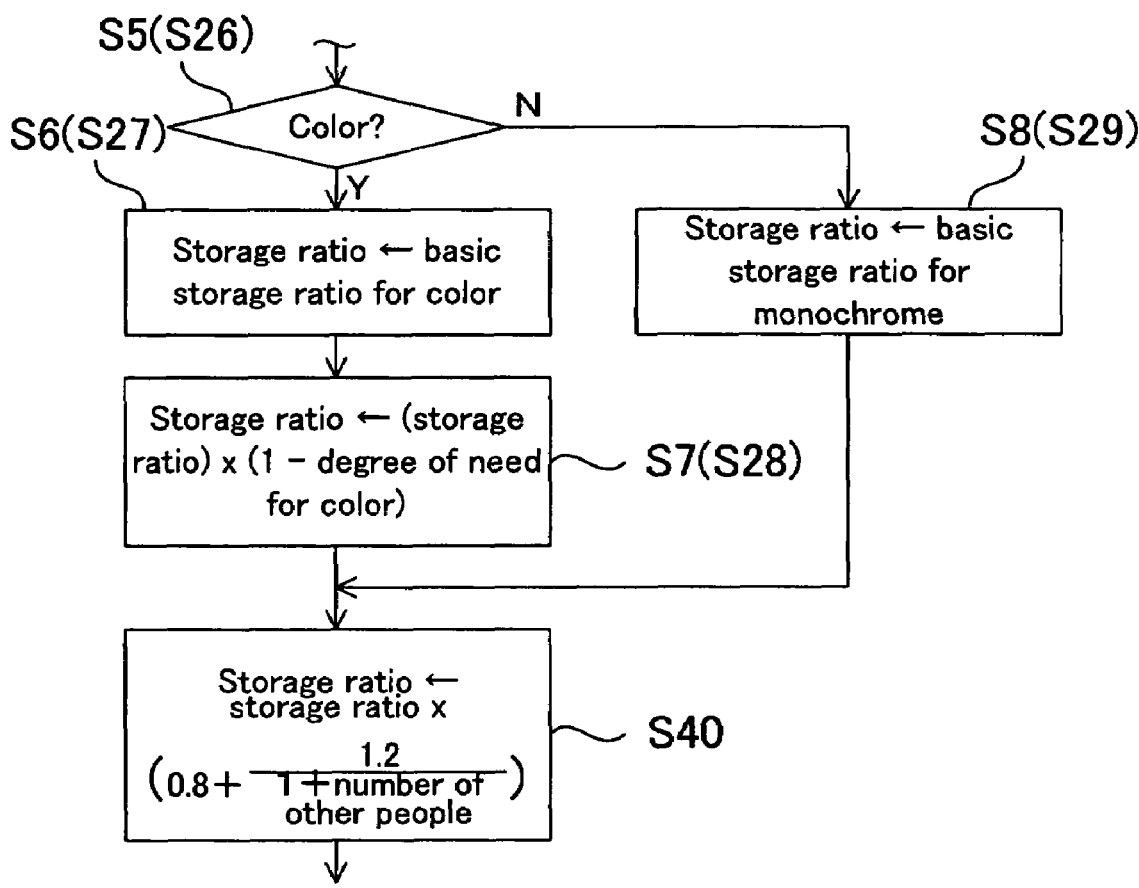
FIG. 9 is a data table of basic storage ratios in the third embodiment.
FIG. 10 is a flowchart showing a portion of the control operation in the third embodiment.

The employee counter 85 reads the user data in the storage portion 15 and totals the current number of employees present. The number of employees present is used to set the basic storage ratios. FIG. 9 shows a basic storage ratio data table 86. Basic storage ratios are registered in the basic storage ratio data table 86 for monochrome imaging and color imaging respectively corresponding to "more than three people,""one or two people," and "no people" as the number of employees present (the number of employees present other than the user who is about to execute image processing). Specifically, the basic storage ratio is set higher for "one or two people" than for "more than three people" as the number of employees present, and the basic storage ratio is set higher for "no people" than for "one or two people" as the number of employees present.

This is because, as in the case of the first embodiment, consideration is given to conditions such as the number of people in an office space where the users are (environmental conditions of the user vicinity) that affect the tendency for unauthorized usage of an image processing device, and the information storage ratios (basic storage ratios) are varied in accordance with such environmental conditions. In other words, the greater the tendency for unauthorized usage of the image processing device 1 can occur in an environment (the smaller the number of people present), the higher the information storage ratio is set. This enables image data with a high potential for unauthorized usage to be stored with a high ratio.

In the present embodiment, whether or not to store information in the storage portion 15 is determined using basic storage ratios that are set based on the basic storage ratio data table 86, and information in which image data and the user ID code are associated is stored in the storage portion 15 as required.

FIG. 10 shows a portion of the flowchart of the control operation carried out in the present embodiment and takes the place of steps S5 to S8 in the flowchart (operation at the time of copying) shown in FIG. 2. That is, after the storage ratio is determined in step S7 or step S8, the procedure proceeds to step S40, and storage ratio×{(0.8+1.2/(1+number of other people)} is calculated to determine the applicable storage ratio. After this applicable storage ratio is determined, the processes starting from the above-mentioned step S9 are carried out.

Furthermore, this is the same for the operation at the time of printing, and the flowchart of FIG. 10 takes the place of steps S26 to S29 in the flowchart shown in FIG. 3. That is, after the storage ratio is determined in step S28 or step S29, the procedure proceeds to step S40, and storage ratio×{0.8+1.2/(1+number of other people)} is calculated to determine the applicable storage ratio. After this applicable storage ratio is determined, the processes starting from the above-mentioned step S30 are carried out.

With the present embodiment, even in cases in which the number of people present in the vicinity in the same time period varies remarkably due to, for example, office holidays, uneven attendance levels for work on holidays, flex-time systems and the like, the number of people present can be accurately estimated, thus enabling improved monitoring efficiency to be achieved.

Fourth Embodiment

Figure 11:
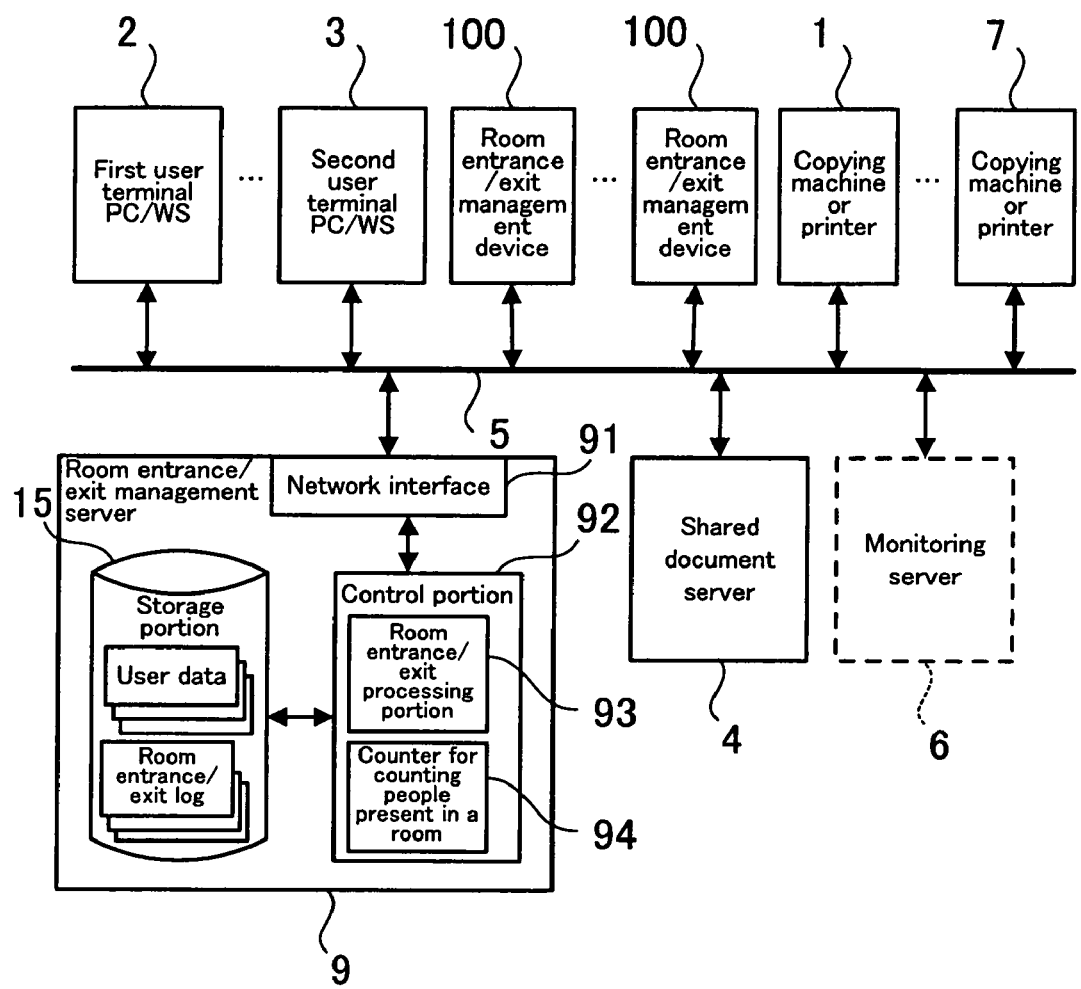
FIG. 11 is a data table of basic storage ratios in a fourth embodiment.

Next, a fourth embodiment is described. The embodiment is described for the case, as shown in FIG. 11, of the present invention being applied to a network system such that a plurality of user terminals 2 and 3, a plurality of image processing devices 1 and 7, a shared document server 4, a monitoring server 6, room entrance/exit management devices 100 provided for each room, and a room entrance/exit management server 9 are connected to a network (LAN). Here also, the same reference numerals are used in FIG. 11 for components that are the same as in the above-described embodiments. And only the points that differ from the above-described embodiments are described below.

As shown in FIG. 11, the network system according to the present embodiment is arranged with the room entrance/exit management server 9, and the storage portion 15 is provided in this room entrance/exit management server 9. That is, information in which the user (ID code) and image data are associated is stored in the room entrance/exit management server 9, not the image processing devices 1 and 7 or the monitoring server 6.

When it is determined that information is to be stored to the storage portion 15 (when determined to be "yes" at step S9 and "completed" at step S13 in the flowchart of FIG. 2, and when determined to be "yes" at step S30 and "completed" at step S32 in the flowchart of FIG. 3), the room entrance/exit management server 9 receives at a network interface 91 the information in which image data and the user ID code are associated from the image processing device 1 via the network cabling 5, and supplies this to a control portion 92. The control portion 92 stores in the storage portion 15 the information in which image data and the user ID code are associated.

In the present embodiment, the storage determination portion 14d that makes the determination (the determination of whether or not to store in the storage portion 15 the information in which image data and the user ID code are associated) may be provided in the image processing devices 1 and 7, and may be provided in the room entrance/exit management server 9.

Furthermore, the room entrance/exit management server 9 is provided with a room entrance/exit processing portion 93 and a counter 94 for counting people present in a room.

The room entrance/exit processing portion 93 recognizes the entering and exiting of each user in the office. Specifically, a pass-through detector 90 (see FIG. 12), which is made of the above-mentioned room entrance/exit management devices 100, is provided in the vicinity of the office entrance. The pass-through detector 90 is made of an outside detector 90a, which is arranged outside the room, and an inside detector 90b, which is arranged inside the room. Each user carries a transmitter that transmits a transmission signal by which the detectors 90a and 90b are able to recognize the user ID.

Figure 12:
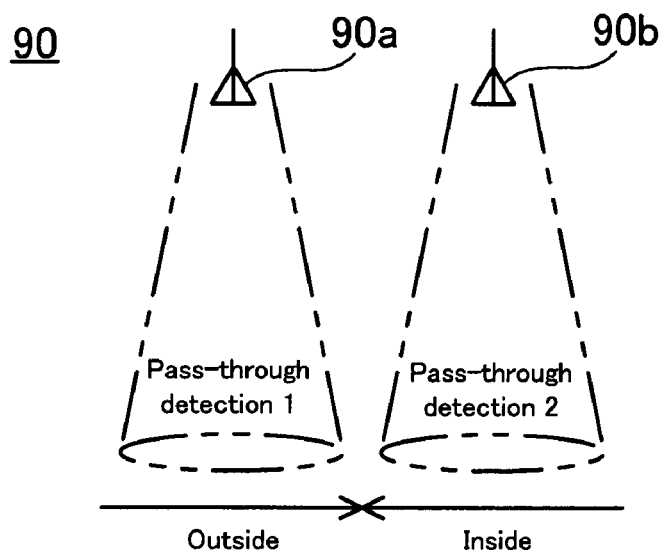
FIG. 12 is a diagram of pass-through detectors according to the fourth embodiment.
Figure 13:
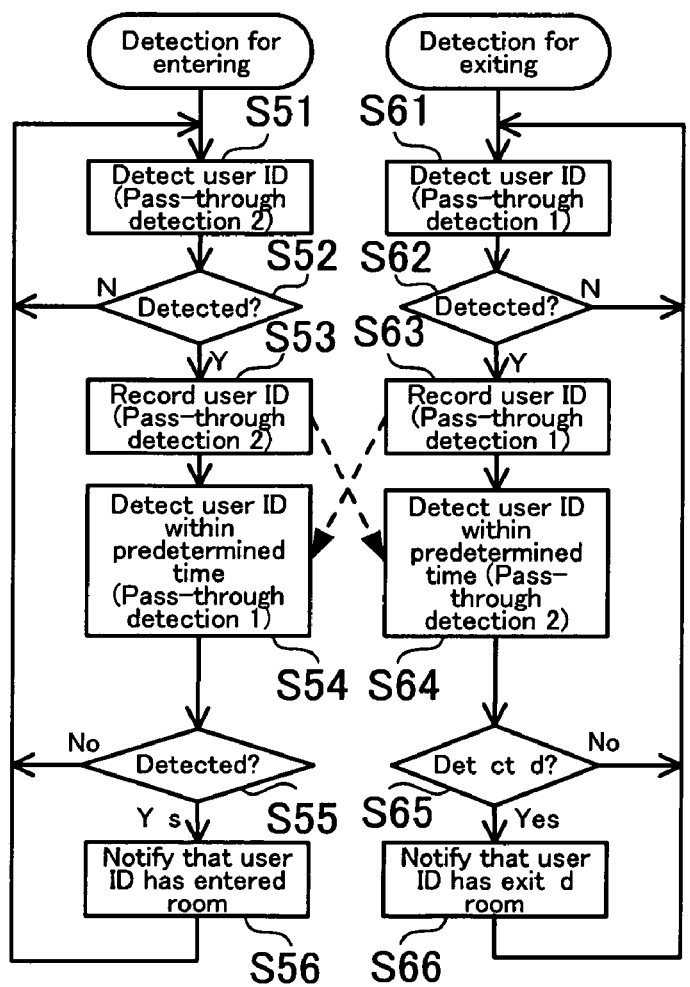
FIG. 13 is a flowchart showing a verification operation for the entering and exiting of each user.

FIG. 13 is a flowchart showing an operation in which the entering and exiting of each user in an office are recognized using the outside detector 90a and the inside detector 90b. In FIGS. 12 and 13, the detection of a user by the outside detector 90a is indicated as "pass-through detection 1," and the detection of a user by the inside detector 90b is indicated as "pass-through detection 2."

First, when the presence of a user is detected by the inside detector 90b as a room-entering detection operation, the detected user ID is recorded (steps S51 to S53). Then it is determined whether or not the presence of the user to whom the detected user ID belongs has been detected by the outside detector 90a within a predetermined time. That is, it is determined whether or not the user has made a transition from the outside to the inside (steps S54 and S55). When this is determined to be "yes," it is determined that the user to whom the user ID belongs has entered the room (step S56), and "1" is added to the count of the counter 94 for counting people present in a room.

On the other hand, when the presence of a user is detected by the inside detector 90a as a room-exiting detection operation, the detected user ID is recorded (steps S61 to S63). Then it is determined whether or not the presence of the user to whom the detected user ID belongs has been detected by the inside detector 90b within a predetermined time. That is, it is determined whether or not the user has made a transition from the inside to the outside (steps S64 and S65). When this is determined to be "yes," it is determined that the user to whom the user ID belongs has exited the room (step S66), and "1" is subtracted from the count of the counter 94 for counting people present in a room. With these operations, the counter 94 for counting people present in a room is able to recognize the current number of people present in the office.

The basic storage ratio is then set based on the number of people present, this number being recognized by the counter 94 for counting people present in a room. In the present embodiment, as in the above-described third embodiment, whether or not to store information in the storage portion 15 is determined using basic storage ratios that are set based on the basic storage ratio data table 86 shown in FIG. 9, and information in which image data and the user ID code are associated is stored in the storage portion 15 as required. In the present embodiment, whether or not to store information in the storage portion 15 is determined in the same way as in the above-described third embodiment.

With the present embodiment, even in cases in which equipment is installed in numerous departments and common-use locations such as meeting rooms, reception rooms, laboratories, and the like, the number of people present in the rooms can be accurately estimated, thus enabling improved monitoring efficiency to be achieved.

Other Embodiments

Figure 14:
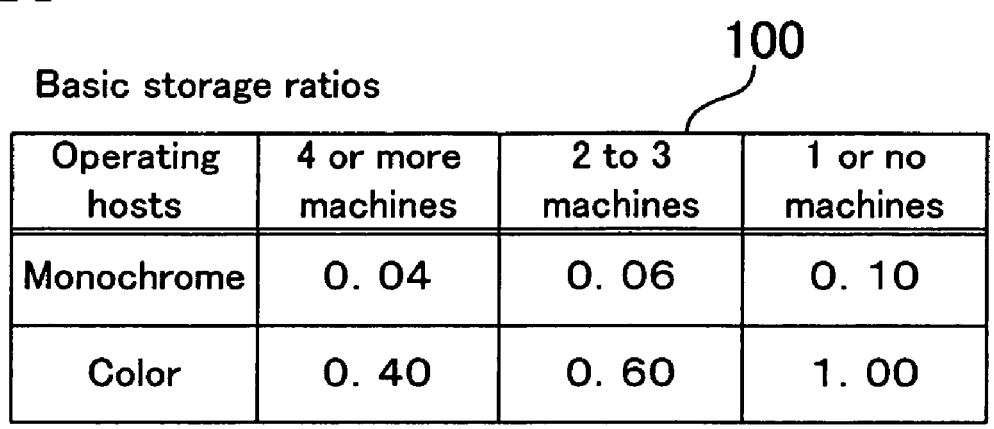
FIG. 14 shows a basic storage ratio data table for setting the basic storage ratios based on the number of currently operating host machines.

In the above-described embodiments, the basic storage ratios were set using the date/time, the number of employees in the office, and the number of people present in the room, but it is also possible to determine whether or not to store information in the storage portion 15 by obtaining information concerning the number of currently operating host machines (user terminals 2 and 3) that are connected to the network, and using an information storage ratio that is higher for fewer currently operating host machines. FIG. 14 shows a basic storage ratio data table for setting the basic storage ratios based on the number of currently operating host machines. Basic storage ratios are registered in this basic storage ratio data table for monochrome imaging and color imaging respectively corresponding to "four or more machines," "two or three machines," and "one or no machines" as the number of operating host machines. Specifically, the basic storage ratio is set higher for "two or three machines" than for "four or more machines" as the number of operating host machines, and the basic storage ratio is set higher for "one or no machines" than for "two or three machines." In this way, as long as the devices are connected to the network, the number of people in a vicinity can be estimated without any special added system, thus enabling improved monitoring efficiency to be achieved.

Furthermore, when varying the storage ratio in response to the number of currently operating host machines (user terminals 2 and 3) in this way, the storage determination portion 14d is arranged to obtain information concerning the history of image processing requests (image processing requests from users using a host machine) to the image processing device 1 by each host machine connected to the network. The storage ratio used in the determination operation carried out by the storage determination portion 14d is based on the frequency of image processing requests from currently operating host machines other than the host machine that is requesting image processing, this frequency of image processing requests being recognized from the above-mentioned history information, and the storage ratio is set higher for lower frequencies of image processing requests. In other words, when the frequency of image processing requests from host machines other than the host machine that is requesting image processing is high, there is a high probability that the users of those host machines (host machines not currently requesting image processing) will subsequently request image processing and move to the location where the image processing device 1 is installed. That is, the act of these users moving to the location where the image processing device 1 is installed acts as a deterrent against unauthorized usage by other users. Therefore, since the probability of unauthorized usage occurring in this case is low, the storage ratio is set low. Specifically, as stated above, the set storage ratio is adjusted down depending on the number of currently operating host machines. Conversely, when the frequency of image processing requests from host machines other than the host machine that is requesting image processing is low, there is a low probability that the users of those host machines (host machines not currently requesting image processing) will subsequently request image processing and move to the location where the image processing device 1 is installed. That is, the situation is such that it is difficult for the act of these users moving to the location where the image processing device 1 is installed to be used as a deterrent against unauthorized usage by other users. Therefore, since the probability of unauthorized usage occurring in this case is high, the storage ratio is set high. Specifically, as stated above, the set storage ratio is adjusted up depending on the number of currently operating host machines. By setting the storage ratio in this way, it is possible to factor in the degree of deterrent against unauthorized usage to the user to derive higher ratios for image data that has a high probability for unauthorized usage, thus enabling further improvements in monitoring efficiency to be achieved.

The image processing device 1 in the above-described embodiments served as a copying machine, a printer, and a scanner. However, there is no limitation to this in the present invention, and it may also serve as a so-called "PC fax," which is capable of sending facsimiles from the user terminals 2 and 3. Furthermore, the present invention may be used for an image processing device 1 that is provided with at least one of these functions.

Also, as strictly controlled items, the IC cards or the like in the above-described embodiments are used with user identification information such as an entered user ID being supplied as it is to the user ID identification portion 14a. However, there is no limitation to this in the present invention, and in order to prepare against unauthorized usage such as that involving theft of an IC card, it is also possible to provide the user ID identification portion 14a with a user verification function that checks the user ID against a password entered using the user interface 16 for example, so that only verified users are able to use the functions of the image processing device 1. This makes the match between users and user identification information such as user IDs more reliable. Moreover, for adding a user verification function, it is possible to provide a verification server on the network (for example one which uses a protocol such as LDAP, Lightweight Directory Access Protocol) so that user ID codes and passwords are centrally managed using the verification server. It should be noted that it is preferable for the verification server to be provided not only with user ID codes and passwords, but also high-level verification algorithms, and for functions that can be used to be managed on a per-user basis.

The present invention can be practiced in various other forms without departing from the sprit or essential characteristics thereof. Therefore, the above embodiments were described in all respects by way of example only and should not be construed as limiting. The scope of the present invention is defined by the appended claims, and is by no means restricted to the text of the specification. Furthermore, all the alterations or modifications covered by the scope of the claims and equivalents thereof fall within the scope of the present invention.

What is claimed is:

1. An unauthorized usage monitoring system for monitoring unauthorized usage of an image processing device, which performs image processing in response to a request for image processing, comprising:

an identification means for identifying a user who requests image processing; a storage means capable of storing information in which the user identified by the identification means is associated with at least a portion of the image data for which the user requested image processing; and a determination means for determining whether or not to carry out information storage to the storage means; wherein the determination means uses an information storage ratio that is set based on a tendency for unauthorized usage of the image processing device corresponding to an environmental condition to determine whether or not to carry out information storage to the storage means, wherein the environmental condition for setting the information storage ratio is the number of people in a space in which the image processing device is installed, and wherein, in determining whether or not to carry out information storage to the storage means, the determination means uses an information storage ratio that is higher for lower numbers of people in the space in which the image processing device is installed.

2. An unauthorized usage monitoring system for monitoring unauthorized usage of an image processing device, which performs image processing in response to a request for image processing, comprising:

an identification means for identifying an ID code of a user who requests image processing; a storage means capable of storing information in which the ID code of the user identified by the identification means is associated with at least a portion of the image data for which the user requested image processing; and a determination means for determining whether or not to carry out information storage to the storage means; wherein the determination means uses an information storage ratio that is set based on a tendency for unauthorized usage of the image processing device corresponding to an environmental condition to determine whether or not to carry out information storage to the storage means, wherein the unauthorized usage monitoring system is installed in an office, and wherein, in determining whether or not to carry out information storage to the storage means, the determination means obtains information concerning signing in to and signing out from work at the office, and uses an information storage ratio that is higher for lower numbers of people signed in at the office.

3. An unauthorized usage monitoring system for monitoring unauthorized usage of an image processing device, which is configured to be capable of sending and receiving information to and from a monitoring server, comprising:

an identification means for identifying a user who requests image processing; a storage means that is provided in the monitoring server and is capable of storing information in which the user identified by the identification means is associated with at least a portion of the image data for which the user requested image processing; and a determination means for determining whether or not to carry out information storage to the storage means; wherein the determination means determines whether or not to carry out information storage to the storage means with an information storage ratio that is set based on a tendency for unauthorized usage of the image processing device corresponding to an environmental condition, wherein the environmental condition for setting the information storage ratio is normal business hours versus not normal business hours, and wherein, in determining whether or not to carry out information storage to the storage means, the determination means uses an information storage ratio that is higher for days and times that are not normal business hours.

4. The unauthorized usage monitoring system for image processing devices according to any of claims 1, 2, and 3, wherein the determination means determines whether or not to carry out information storage to the storage means by comparing a set information storage ratio with a random number.

5. The unauthorized usage monitoring system for image processing devices according to any of claims 1 and 2, wherein the environmental condition for setting the information storage ratio is at least one of a date and a time, and wherein, in determining whether or not to carry out information storage to the storage means, the determination means uses an information storage ratio that is higher for days and times in which "the tendency for unauthorized usage of the image processing device" is higher.

6. The unauthorized usage monitoring system for image processing devices according to claim 4, wherein the environmental condition for setting the information storage ratio is at least one of a date and a time, and wherein, in determining whether or not to carry out information storage to the storage means, the determination means uses an information storage ratio that is higher for days and times in which "the tendency for unauthorized usage of the image processing device" is higher.

7. The unauthorized usage monitoring system for image processing devices according to any of claims 1 and 3, wherein the unauthorized usage monitoring system is installed in an office, and wherein, in determining whether or not to carry out information storage to the storage means, the determination means obtains information concerning signing in to and signing out from work at the office, and uses an information storage ratio that is higher for lower numbers of people signed in at the office.

8. The unauthorized usage monitoring system for image processing devices according to claim 4, wherein the unauthorized usage monitoring system is installed in an office, and wherein, in determining whether or not to carry out information storage to the storage means, the determination means obtains information concerning signing in to and signing out from work at the office, and uses an information storage ratio that is higher for lower numbers of people signed in at the office.

9. The unauthorized usage monitoring system for image processing devices according to any of claims 1, 2, and 3, wherein the unauthorized usage monitoring system is installed in an office, and wherein, in determining whether or not to carry out information storage to the storage means, the determination means obtains information concerning entering and exiting a room at the office, and uses an information storage ratio that is higher for lower numbers of people present in the office.

10. The unauthorized usage monitoring system for image processing devices according to claim 4, wherein the unauthorized usage monitoring system is installed in an office, and wherein, in determining whether or not to carry out information storage to the storage means, the determination means obtains information concerning entering and exiting a room at the office, and uses an information storage ratio that is higher for lower numbers of people present in the office.

11. The unauthorized usage monitoring system for image processing devices according to any of claims 2, and 3, wherein the unauthorized usage monitoring system is connected to an office network, and wherein, in determining whether or not to carry out information storage to the storage means, the determination means obtains information concerning the number of currently operating host machines that are connected to the network, and uses an information storage ratio that is higher for lower numbers of currently operating host machines.

12. The unauthorized usage monitoring system for image processing devices according to claim 4, wherein the unauthorized usage monitoring system is connected to an office network, and wherein, in determining whether or not to carry out information storage to the storage means, the determination means obtains information concerning the number of currently operating host machines that are connected to the network, and uses an information storage ratio that is higher for lower numbers of currently operating host machines.

13. The unauthorized usage monitoring system for image processing devices according to claim 11, wherein, the determination means obtains information concerning the history of image processing requests to the image processing device by host machines connected to the network, recognizes from the history information the frequency of requests for image processing of currently operating host machines other than the host machine that is requesting image processing, and uses an information storage ratio that is higher for lower frequencies of requests for image processing in determining whether or not to carry out information storage to the storage means.

14. The unauthorized usage monitoring system for image processing devices according to claim 12, wherein, the determination means obtains information concerning the history of image processing requests to the image processing device by host machines connected to the network, recognizes from the history information the frequency of requests for image processing of currently operating host machines other than the host machine that is requesting image processing, and uses an information storage ratio that is higher for lower frequencies of requests for image processing in determining whether or not to carry out information storage to the storage means.

15. The unauthorized usage monitoring system for image processing devices according to any of claims 2, and 3, wherein color imaging or monochrome imaging can be selected in the image processing device, and wherein in determining whether or not to carry out information storage to the storage means, the determination means uses an information storage ratio that is higher for the times of performing color imaging than for the times of performing monochrome imaging.

16. The unauthorized usage monitoring system for image processing devices according to claim 4, wherein color imaging or monochrome imaging can be selected in the image processing device, and wherein in determining whether or not to carry out information storage to the storage means, the determination means uses an information storage ratio that is higher for the times of performing color imaging than for the times of performing monochrome imaging.

17. A control method that is executed on the unauthorized usage monitoring system of any of claims 1 to 4 and 5 to 16, wherein a determination operation is performed in which whether or not to carry out information storage to the storage means is determined using an information storage ratio that is set based on a tendency for unauthorized usage of the image processing device corresponding to an environmental condition, and wherein a storage operation is performed in which information in which a user who requested image processing and at least a portion of the image data for which image processing was requested by that user are associated and stored in the storage means when a determination has been made to carry out information storage to the storage means.

18. An unauthorized usage monitoring system for monitoring unauthorized usage of an image processing device, which performs image processing in response to a request for image processing, comprising:

an identification means for identifying a user who requests image processing; a storage means capable of storing information in which the user identified by the identification means is associated with at least a portion of the image data for which the user requested image processing; and a determination means for determining whether or not to carry out information storage to the storage means; wherein the determination means uses an information storage ratio that is set based on a tendency for unauthorized usage of the image processing device corresponding to an environmental condition to determine whether or not to carry out information storage to the storage means, wherein the unauthorized usage monitoring system is connected to an office network, and wherein, in determining whether or not to carry out information storage to the storage means, the determination means obtains information concerning the number of currently operating host machines that are connected to the network, and uses an information storage ratio that is higher for lower numbers of currently operating host machines.

19. An unauthorized usage monitoring system for monitoring unauthorized usage of an image processing device, which performs image processing in response to a request for image processing, comprising:

an identification means for identifying a user who requests image processing; a storage means capable of storing information in which the user identified by the identification means is associated with at least a portion of the image data for which the user requested image processing; and a determination means for determining whether or not to carry out information storage to the storage means; wherein the determination means uses an information storage ratio that is set based on a tendency for unauthorized usage of the image processing device corresponding to an environmental condition to determine whether or not to carry out information storage to the storage means, wherein color imaging or monochrome imaging can be selected in the image processing device, and wherein in determining whether or not to carry out information storage to the storage means, the determination means uses an information storage ratio that is higher for the times of performing color imaging than for the times of performing monochrome imaging.

* * * * *